United States Patent [19]

Masotto et al.

[11] 4,436,655
[45] Mar. 13, 1984

[54] PROCESS FOR THE CONTINUOUS PURIFICATION OF CONTAMINATED FLUIDS AND FOR CONDITIONING THE RESULTING CONCENTRATES

[75] Inventors: Ermanno Masotto; Sergio Gagliardi, both of Rome, Italy

[73] Assignee: Comitatonazionale Per Lienergia Nucleare, Rome, Italy

[21] Appl. No.: 278,419

[22] Filed: Jun. 29, 1981

Related U.S. Application Data

[63] Continuation of Ser. No. 86,669, Oct. 19, 1979, abandoned.

[30] Foreign Application Priority Data

Oct. 27, 1978 [IT]  Italy ............................... 51669 A/78

[51] Int. Cl.³ ............................................. G21F 9/12
[52] U.S. Cl. .................................. 252/628; 210/682; 210/751; 252/631; 252/633
[58] Field of Search ............... 210/682, 751, 202, 208, 210/219, 259, 287, 295, 319; 252/631, 633, 628

[56] References Cited

U.S. PATENT DOCUMENTS

| | | | |
|---|---|---|---|
| 3,642,616 | 2/1972 | Burns | 210/264 |
| 3,658,179 | 4/1972 | Baumann et al. | 252/633 |
| 3,838,061 | 9/1974 | Cuaz et al. | 252/633 |
| 3,883,441 | 5/1975 | Murphy et al. | 252/633 |
| 4,058,479 | 11/1977 | White et al. | 252/633 |
| 4,077,901 | 3/1978 | Arnold et al. | 252/633 |
| 4,107,044 | 8/1978 | Levendusky | 210/266 |

*Primary Examiner*—Ivars C. Cintins
*Attorney, Agent, or Firm*—Cushman, Darby & Cushman

[57] ABSTRACT

A method and apparatus for removing and disposing of contaminants from a contaminated fluid makes use of an expendable collection receptacle which is encapsulated in an inert protective matrix except for inlet and outlet ports and which is capable of removing and retaining contamination from the liquid when passed therethrough. The removed and retained contamination is subsequently encapsulated in a solid material within the receptacle by introducing a settable fluid material into the receptacle. The inlet and outlet ports are then encapsulated in a solid inert matrix so that the receptacle can be disposed of.

8 Claims, 33 Drawing Figures

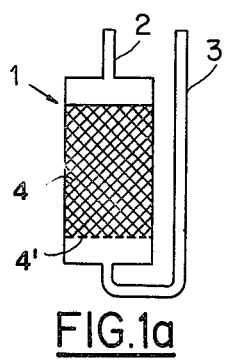
FIG.1a
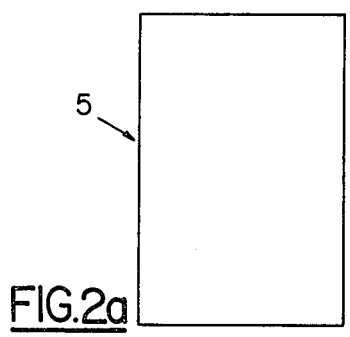
FIG.2a
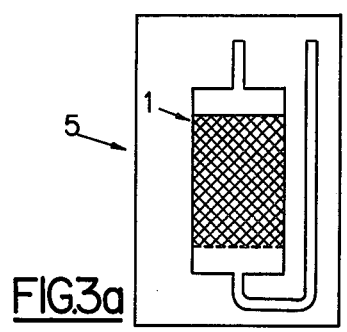
FIG.3a
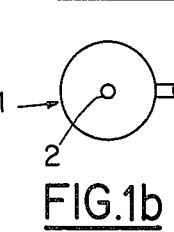
FIG.1b
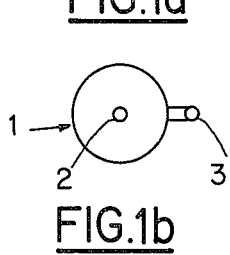
FIG.2b
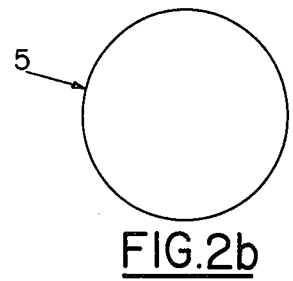
FIG.3b
FIG.4a
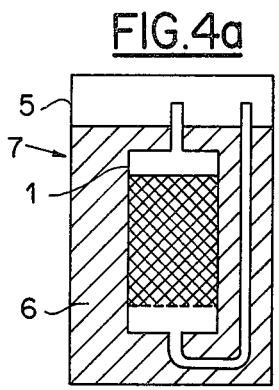
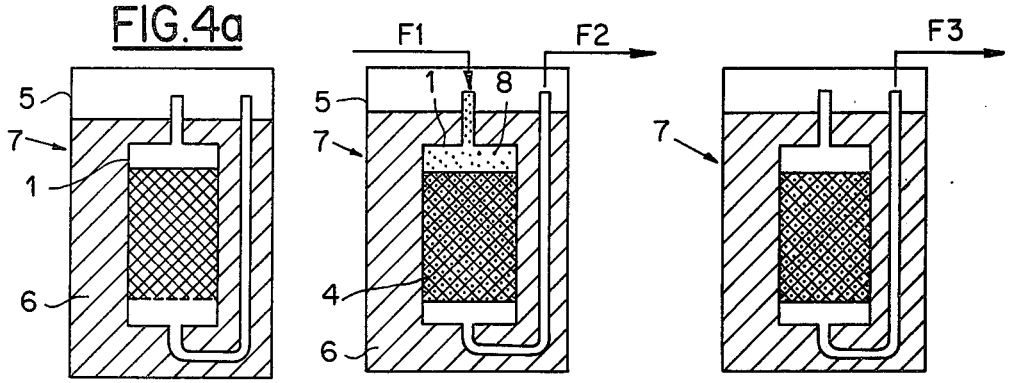
FIG.5  FIG.6
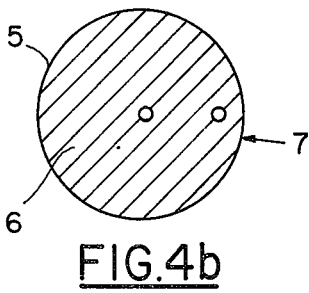
FIG.4b
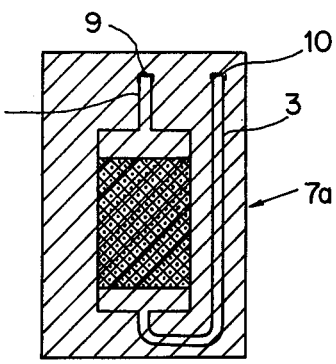
FIG.7

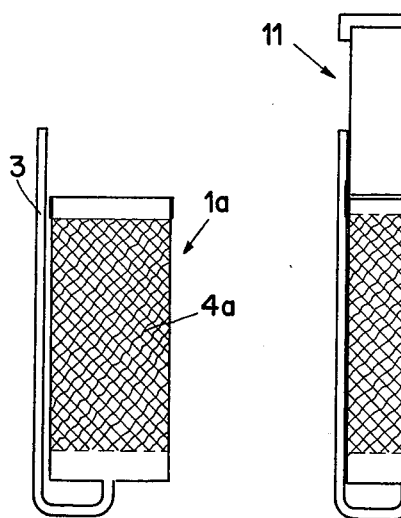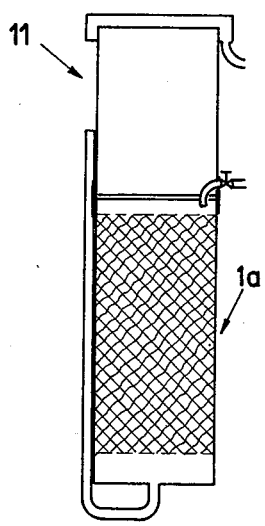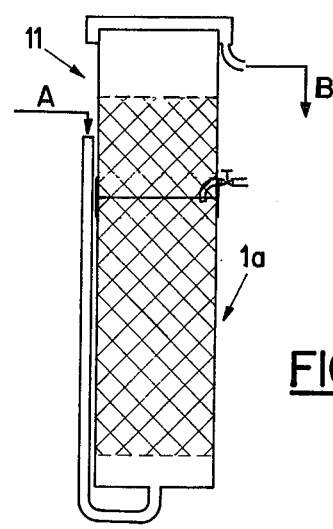
FIG.8  FIG.9  FIG.10
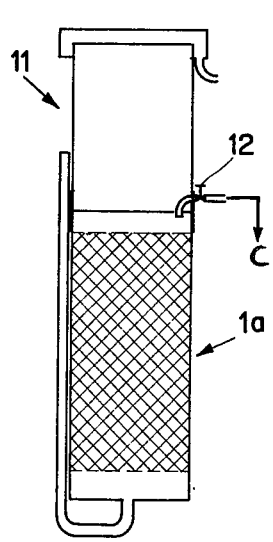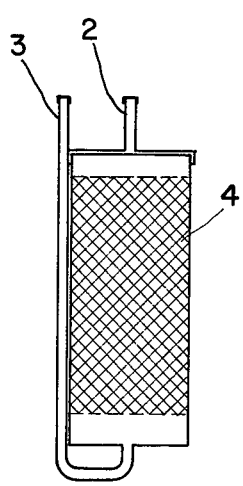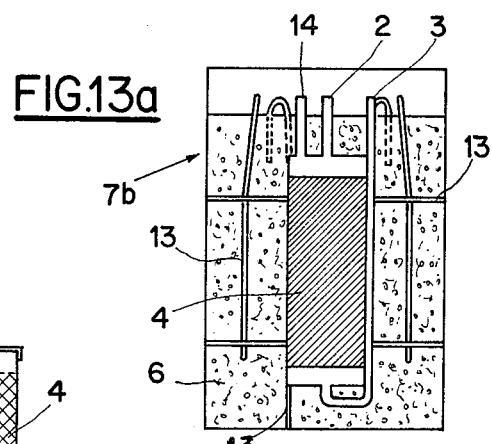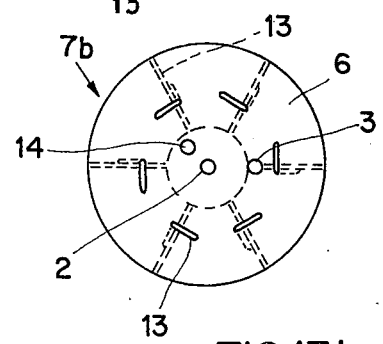
FIG.11  FIG.12  FIG.13a  FIG.13b

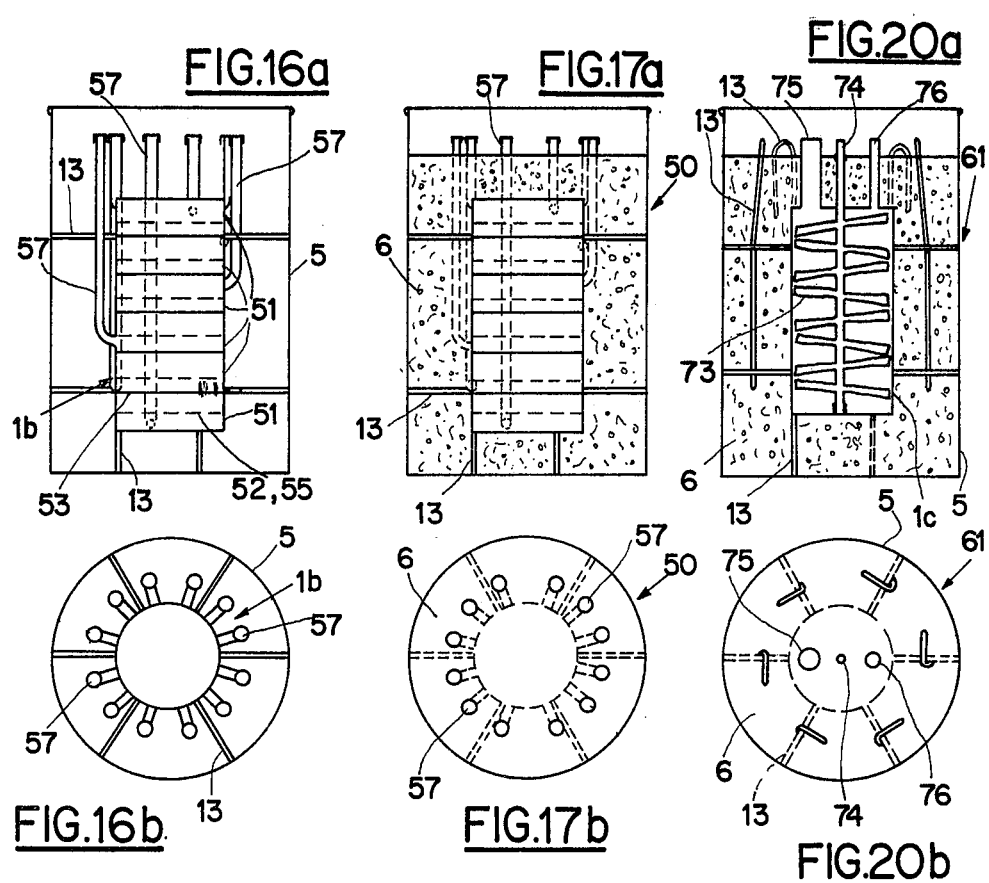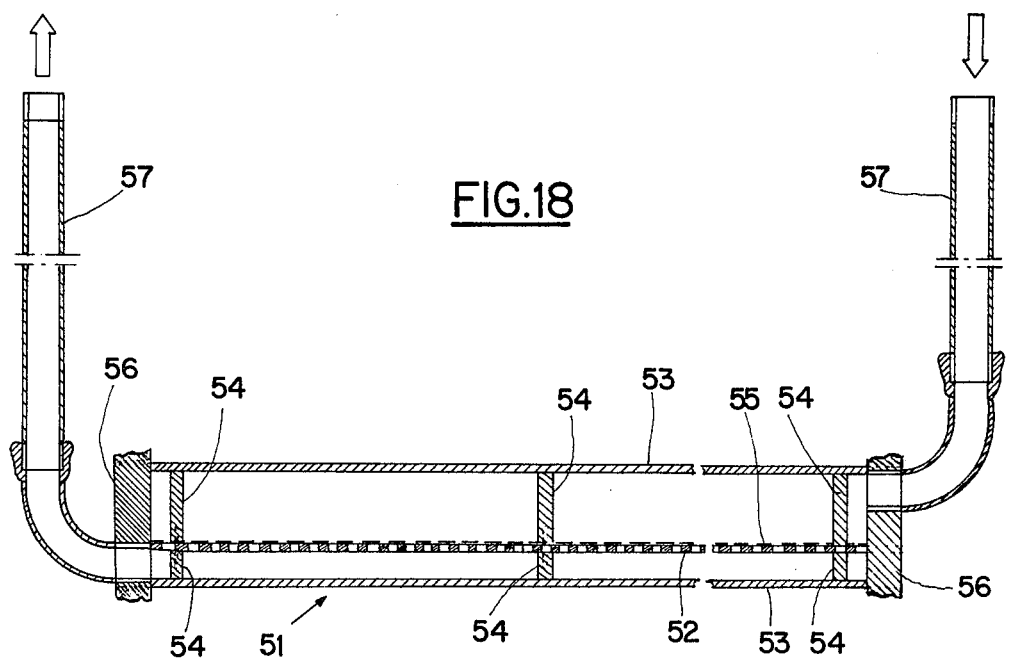

PROCESS FOR THE CONTINUOUS PURIFICATION OF CONTAMINATED FLUIDS AND FOR CONDITIONING THE RESULTING CONCENTRATES

This is a continuation of application Ser. No. 86,669 filed Oct. 19, 1979, now abandoned.

DESCRIPTION

The present invention relates to a process for purifying fluids in general, however contaminated, that is, those contaminated by radioactive substances or non-radioactive substances, such as toxic or chemically active compounds and the like, as well as for conditioning the concentrates resulting from such a process. The invention also relates to a plant for carrying out this process.

The present invention is of particular application to water containing radioactive substances in solution and, or in dispersion and, or in suspension, such as for example water for re-use (water of the storage baths for irradiated nuclear fuel elements, cooling water for nuclear reactors etc.) and waste radioactive water (end products of chemical processes, drainage water, solutions resulting from decontamination operations, etc)

The volume of radioactive water (water to be re-used + waste water) to which the invention may be applied is 80-90% of the total quantity of radioactive water which is produced.

From a purely chemical point of view, the radioactive water which is normally re-used consists of dilute solutions of inorganic substances of an ionic nature with a low activity.

Radioactive liquid wastes may be considered as dilute aqueous solutions of inorganic and organic substances of an ionic and/or molecular nature which also contain colloidal dispersions as well as substances in solid suspension, the radioactive content of which may vary within very wide limits.

Various systems and plants are known for purifying radioactive water of low and medium level activity; it is well-known that this purification is in fact carried out by means of various processes (chemical precipitation, evaporation, ion exchange, etc.) all of which tend to produce a reduction in volume with formation of concentrates containing almost all the original radioactivity. All these processes for purifying radioactivity water thus present the problem of the further handling of these concentrates, this being necessary to reduce them to a form suitable for their subsequent, final discharge. This handling involves high risks due to the presence of the original radioactive substances in a considerably concentrated form (by at least a factor of $10^3$), which renders necessary the use of costly technical devices to allow the handling of such concentrates in safety.

In particular, as is known, the ion-exchange treatment involves the regeneration of the exchange beds, which is effected, in the usual purifying columns, by feeding the regenerating liquid through the exchage beds in the columns in the same direction (when a compound bed is used, the regenerant liquid is conveyed in the same direction for the regeneration of anionic resin and in the counter direction for the regeneration of cationic resin) as that of the preceding feed of the liquid to be purified; the radioactive substances which have been retained by the exchange beds are hence taken up in liquid form in the regeneration liquid; this latter is concentrated in radioactive material at the outlet from the regenerated column and hence requires a subsequent conditioning process or process for "rendering insoluble" to transform the greater part of this liquid into an insoluble solid, in that, only the insoluble solid state of the radioactive waste can have those characteristics of mechanical strength and chemico-physical resistance which are absolutely necessary to ensure that environmental polution will not occur, in time, in the place of its final discharge (depths of the sea, underground bunker and the like).

The above-mentioned "rendering insoluble" however, presents serious disadvantages in that, precisely because it involves the handling of these liquids which are concentrated in radioactive substances, it can be achieved only by recourse to costly precautionary measures such as the use of sealed and shielded environments, equipment for remote-control manipulation and viewing, as well as plant for ventilation, fire precautions and for collecting possible leakages of radioactive liquids, etc.; similar, costly preventive measures may also be necessary even earlier, or during the purification stage of the liquids to be decontaminated, particulary for the shielding and remote-control of the purification installations for these liquids.

The object of the present invention, is, therefore, to avoid the aforementioned disadvantages of the prior art by providing a process and a plant which allow fluids to be purified, however contaminated, and which, at the same time, resolve the problem of rendering the resulting concentrates from the treatment insoluble, without any further handling of the concentrates themselves.

The principle on which the present invention is based consists essentially in the use of expendable collecting means for the substances contaminating the fluid to be treated, these collecting means being entirely encapsulated (the encapsulating is initially effected by leaving inlet ports and possibly outlet ports open for the fluid as well as possibly vents for air) within suitable containers, in a solid inert matrix, the thickness of which acts as a biological shield and, or as a mechanically and chemically resistant coating. The outer container, the said encapsulating matrix and the encapsulated collecting means constitute a single unit which will hereinafter be called a "preconditioned cartridge." The use of the preconditioned cartridge is as follows:

first stage: the fluid to be treated is purified, with retention of the contaminating substances within the preconditioned cartridge;

second stage (possible): the residual decontaminated liquid present in the cartridge is removed by lowering of the pressure;

third stage: the contaminating substances are rendered insoluble by the passage into the cartridge containing them of a suitable material which can render them insoluble, and the encapsulation of the collecting means in the inert matrix is completed.

At the end of the process, the preconditioned cartridge and the substances which have been rendered insoluble are biologically shielded and/or have a mechanical strength and chemical resistance such as to render them suitable, without any further handling, for their final discharge, whether in the earth or in the sea, in complete safety.

The principle explained above may be applied to fluids of any nature in that it is sufficient, at the time, to define and to precondition a suitable type of cartridge and then to insert it in a respective plant.

The process of the present invention is substantially characterised by the fact that it includes the operations of: preconditioning collection means for the substances contaminating the fluid to be treated by totally encapsulating them, except for inlet and possible outlet ports for the fluid, in a solid inert matrix which acts as a biological shield and, or as a coating which is resistant to chemical action and to mechanical pressure; purifying the fluid, with retention of the contaminating substances in the said preconditioned means; and conditioning the contaminating substances or rendering them insoluble within the preconditioned means, by passing substances adapted to render the contaminating substances insoluble by encapsulating them into these means, with subsequent encapsulation of the said ports of the preconditioned means in a solid inert matrix having the aforementioned function.

The preconditioned means according to the present invention may take various forms according to the characteristics of the fluid to be purified; these may therefore, as will be better shown below, consist of bed of deconatminating-concentrating material, of meshed filtering means, of receptacles provided with internal agitators, and the like. The operation of purification may also be carried out by different processes according to the characteristics of the fluid to be treated; thus, this latter may be passed through cartridges with decontaminating-concentrating beds and, or through cartridges with filters and, or through decanting means from which the solid which sediments in them is discharged into cartridges with agitators; in other words the purification of the fluid may be carried out, according to the case, by using the various types of cartridge either alone or in any mutual combination. Even the rendering-insoluble operation may be carried out by different processes according to the type of preconditioned cartridge which is to be subjected to the operation itself.

The plant for carrying out the process according to the present invention is, in its turn, essentially characterised by the fact that it includes: preconditioned collecting means for the substances contaminating the fluid to be treated, which means are entirely encapsulated except for inlet and possible outlet ports for the fluid, in a solid inert matrix which acts as a biological shield and, or as a coating resistant to chemical action and to mechanical pressure; one or more stations for purifying the fluid in which this latter is purified with retention of the contaminating substances in the said preconditioned means; and one or more stations for conditioning the contaminating substances or rendering them insoluble within the said collecting means, in which substances suitable for rendering the contaminating substances insoluble by encapsulating them are introduced into these means, with subsequent encapsulation of the said ports of the preconditioned means in a solid inert matrix having the above-mentioned function.

The characteristics and advantages of the process and the plant according to the present invention will become more evident from the following detailed description of several embodiments, given by way of example, with particular reference to the attached drawings, in which;

FIGS. 1a to 4b show schematically the component elements of a cartridge according to the present invention with a decontaminating-concentrating bed, the Figures indicated by "a" being vertical-sectional views while those indicated by "b" are plan views;

FIGS. 5, 6 and 7 are schematic vertical-sectional views of three stages of use of a preconditioned cartridge according to FIGS. 4a and 4b;

FIGS. 8 to 12 illustrate the stages of preparation of the said decontaminating-concentrating bed;

FIGS. 13a to 13b represent schematically, in vertical section and in plan respectively, a preconditioned cartridge similar to that shown in FIGS. 4a and 4b;

FIGS. 16a to 17b represent schematically the component elements of a cartridge according to the invention, with multiple filtering septa, the Figures indicated "a" being vertical-sectional views while those indicated "b" are plan views;

FIG. 18 shows a component of the cartridge according to FIGS. 16a to 17b in diametral, vertical section;

FIGS. 20a and 20b are schematic representations, in vertical section and in plan respectively, of a preconditioned cartridge provided with an agitator;

Figure 14:
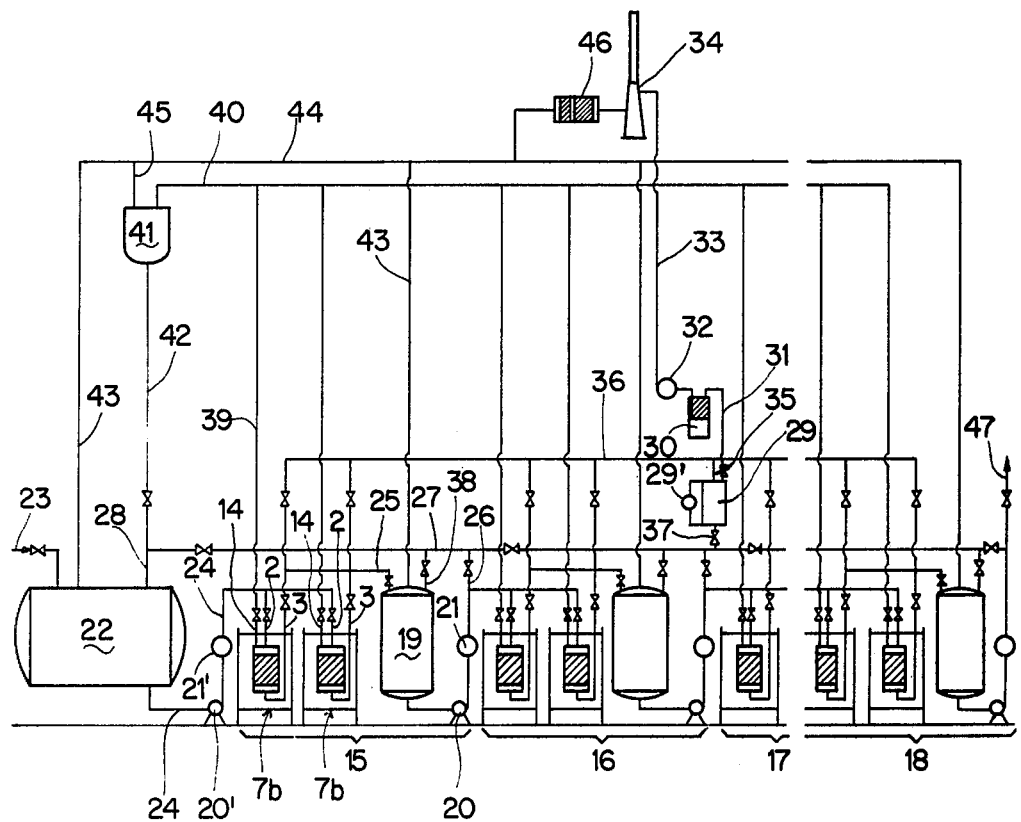
FIG. 14 is a diagram of an embodiment of a purifying station constituting one part of a plant according to the present invention.

Referring firstly to FIGS. 1a to 4b, the component elements of one type of preconditioned cartridge will be described. By 1 is indicated a cylindrical, water-tight receptacle, having two conduits, an inlet conduit and an outlet conduit 2 and 3 respectively; the receptacle contains a bed 4 of decontaminating-concentrating material or means, supported by a perforated disc 4' together with its mesh; a diffuser, not shown, is located between the outlet of the conduit 2 and the upper surface of the bed 4; the space below the disc 4' is filled with a suitable, insert drainage material. The receptacle 1 is installed within a cylindrical container 5 (normally an oil barrel), which is upwardly open, and is then completely encapsulated in a material 6 which forms an inert matrix, and fills the entire space between the receptacle 1 and the container 5 except for the upper portion so as to leave the inlet and outlet ports of the conduits 2 and 3 free. The structure shown in FIGS. 4a and 4b is a single preconditioned cartridge, indicated in its entirety as 7.

The decontaminating-concentrating material, and also the encapsulating material, are chosen at the time, as will be explained below, according to the characteristics of the liquid which is to be purified.

In FIGS. 5, 6 and 7, the use of the preconditioned cartridge 7 is shown schematically. FIG. 5 shows the circulation of contaminated liquid, such as radioactive water for re-use or for waste, which is fed in the direction of arrow F1 through the bed 4 and leaves it, in the direction of arrow F2, in a decontaminated condition; the dots 8 indicate schematically the radioactive particles which become concentrated in the bed 4; the cartridge 7 thus acts as a collector for the contaminating substances.

In the second stage (FIG. 6), after the circulation of FIG. 5 has been stopped, the residual decontaminated liquid still contained in the receptacle 1 is withdrawn therefrom (arrow F3) by suction with a vacuum pump.

In the third stage (FIG. 7), the decontaminating-concentrating medium of the bed 4 is rendered insoluble, as will be better explained below, by means of the immission into the receptacle 1 of a material which can render the medium insoluble; subsequently, after plugs 9 and 10 have been applied to the conduits or tubes 2 and 3, the encapsulation of the receptacle 1, i.e. the filling of the upper portion of the space within the container 5, which is still empty, with material generally the same as the aforementioned encapsulating material 6, is completed.

Thus, as is shown in FIG. 7, the cartridge 7a may hence be conveyed directly, without any further handling, to its place of final disposal, either in the earth or in the sea, under conditions of complete safety.

It should be noted that, before carrying out the said preconditioning of the cartridge, it is necessary to prepare the decontaminating-concentrating bed within the receptacle 1. In FIG. 8 a receptacle 1a is shown, of the same type as the receptacle 1 already described, but without the upper cover and hence the conduit 2. The receptacle 1a contains the decontaminating-concentrating material 4a in a dense form. To prepare the said bed, an expansion chamber 11 is placed over the receptacle 1 (FIG. 9), the chamber 11 being an open-bottomed receptacle which has the function of increasing the useful volume of the receptacle 1a temporarily. Since the dense material 4a may be present in the form of spheres or granules of different dimensions, often accompanied by powder, it is necessary to wash it in counter current to remove the latter and induce the expansion of the bed and, consequently, to induce the ordered disposition of the particles of increasing dimensions and densities at the same time as these are displaced downwardly. The washing and the expansion of the material 4a occurs by means of the input (FIG. 10) of a liquid (inlet:arrow A, outlet for recovery:arrow B) which does not produce any chemical alteration of the material: thus an expansion of the material by about 50% of the volume originally occupied is effected. The input of this liquid is then stopped and the layer of material consequently takes up its rest position, falling back into the receptacle 1, while, after opening of the tap 12 (FIG. 11), the washing liquid which filled the expansion chamber 11 flows down (arrow C) to a recovery vessel. Finally, FIG. 12 shows the receptacle 1a after the removal of the expansion chamber 11 and the application of the upper cover fitted with the conduit 2; the receptacle 1a is thus ready for the preconditioning operation already illustrated.

The aforementioned encapsulating material 6 will be geared, as already indicated, to the particular type of fluid to be purified; in the case of radioactive water for re-use or for waste, this may consist of a plastics material, such as polystyrene (when radioactive substances emitting mainly alpha-radiation are considered), or concrete (when one is dealing with shielding mainly beta and gamma radiations); concrete has, in fact, a greater shielding capacity than polystyrene, but, conversely, it has a lower mechanical strength than the latter for the same thickness of the encapsulating layer of material. In FIGS. 13a and 13b a preconditioned cartridge 7b is shown exactly, this being similar to that indicated 7 in FIG. 4 and having, as the encapsulating material 6, concrete with a reinforcement of iron spacing and support rods indicated 13. A vent conduit for air is also indicated by 14.

FIG. 14 shows schematically a plant for purifying water, for re-use or for waste, containing radioactive substances in solution and, or in dispersion. The radioactivity associated with the water to be decontaminated, this being either for re-use or radioactive waste, is generally distributed between the liquid part and the solid part; "parts" and not phases are spoken of in that, in the most usual situation, the system to be treated may comprise a liquid part consisting mainly of an aqueous phase with traces of organic liquid phases, and a solid part consisting of phases in a disperse form and, or in sedimentable suspension. The type of operation to which the water to be decontaminated is subjected and the outline of the treatment process necessary to ensure the desired factor of decontamination, depend on the type and the number of constituents of the water to be decontaminated. Essentially, there are three cases which are encountered in practice;

(1) water containing radioactive substances in solution and, or in dispersion;

(2) water containing radioactive substances in solution and, or in dispersion plus radioactive substances in stable suspension (by stable suspension is meant a suspension in which the solid particles sediment in times of the order of hours);

(3) water containing radioactive substances in solution and, or in dispersion, plus radioactive substances in stable suspension and further radioactive substances in unstable suspension (by unstable suspension is meant a suspension in which the solid particles sediment in times of the order of minutes).

FIG. 14 refers, as already stated, to a plant for purifying water of the type (1) mentioned above.

In this case the decontaminating-concentrating means consist of beds of a commonly-used resin which acts as an ion-exchange medium (cationic and, or anionic), as an adsorption medium, or both, according to the radioactive substances present in the liquid to be decontaminated, these being in the ionic or in the molecular form or both. The ion exchange and, or adsorption effected is sufficient to decontaminate the water treated by the plant of FIG. 14.

This plant constitutes a purification station which allows the process to be carried out continuously, the station having four decontaminating-concentrating-bed treatment modules 15, 16, 17 and 18, each including two preconditioned cartridges 7b, a reservoir 19, a pump 20 and a radioactivity detector 21. Upstream of the first module 15 is installed a reservoir 22 for collecting the liquid to be purified, which is fed to it through a conduit 23. A conduit 24, with a pump 20' and a radioactivity detector 21', connects the reservoir 22 with the first treatment module 15, or more precisely, with the two inlet conduits 2 of the cartridges 7b. A conduit 25 connects the conduits 3 of the two cartridges with the subsequent reservoir 19. For simplicity, only the elements of the first module 15 are indicated by reference numerals, but it is understood that all the subsequent modules are the same as the preceding one and the same reference numerals used for this latter apply to their elements, and that the following part of the text applies in substantially the same manner to each of the four treatment modules.

During operation of the plant, by closing the valve provided in the conduit 2 of one cartridge and opening the valve provided in the conduit 2 of the other cartridge, the liquid to be purified is circulated only through one of the two cartridges of any one module, while the other rests waiting.

The reservoir 19 has the function of restoring the original hydraulic operating conditions upstream of each cartridge and also allows the recycling of the treated liquid whenever the level of radioactivity surpasses the operative fixed limits. This recycling takes place through the conduits 26, 27 and 28 (for the module 16; its own conduit 26, conduit 27 and conduit 38 of the module 15 which will be mentioned below). The level of radioactivity is controlled by means of the detector located on the feed side of each pump; an optical or acoustic alarm allows the intervention of the operator who, by actuating the respective valves, puts the aforesaid recycling into operation. The self-same alarm, set off by the said radioactivity detector, advises the operator that the cartridge in operation is "saturated," with respect to the radioactivity content of the feed liquid, and then the operator proceeds, by inversion of the valves in the conduits 2, to put the second cartridge of the module, which is "in waiting," into operation and to exclude the "saturated" cartridge. In the act of disconnecting the saturated cartridge from the circuit, a valve is also opened which is connected to a vacuum system and allows the partial or total withdrawal of the residual liquid from the cartridge according to whether the cartridge is to be subjected to further saturation by displacing it to an upstream position (to that corresponding to a liquid of a higher level of specific activity) or is to be considered completely exhausted and hence ready for subjection to the subsequent rendering-insoluble stage, of which more will be said below. It should be noted that the fact that the height which would have been that of a single exchange and/or adsorption bed has been subdivided into several parts (in this specific case, into the said four modules), allows the entire volume of the bed to be saturated, with regard to the concentration of the salts at the inlet, while the concentration of the salts at the outlet remains the same, this being a condition which it is essential to achieve when the exchanger is not to be subject to regeneration, but is expendable, as in the present case. It is understood that a new cartridge will be immediately installed in place of the cartridge removed whereby it will be ready to be put into operation as soon as that which had until then been in operation has been saturated, this procedure thus allowing the continuity of the treatment process.

The said vacuum system includes a receptacle 29, with a level indicator 29', and an absolute filter 30 connected together by means of a conduit 31, upstream of a vacuum pump 32 which is connected through a conduit 33 to a flue 34. This vacuum system is connected (conduits 35 and 36) with the conduits 3 of all the cartridges.

The liquid collected in the receptacle 29 may be recycled (conduits 37, 27 and 28 or 38) upstream of the module to which the vacuum is applied, into the reservoir which precedes it.

The vent conduit 14 of each cartridge is connected (conduits 39 and 40) with a reservoir 41 capable of receiving the excess volume whenever the decontaminating beds present unforeseen impediments to the passage of the liquid or when overflows occur during the stage of starting the process or after the displacement of the cartridges to stages of the process further upstream; a conduit 42 can recycle the liquid from the reservoir 41 to the reservoir 22.

The vent of the reservoirs 22 and 19 is connected (conduits 43, 44) to the flue 34 (to which the reservoir 41 also vents through the conduit 45) with the interposition of an absolute filtration group 46 for retaining particles suspended in the air.

Lastly, by 47 is indicated the conduit through which the decontaminated liquid finally leaves the plant of FIG. 14.

The process has considerable flexibility in that it is possible to vary the quantity and hence the volume of the concentrator material for the radionuclides and consequently the thickness of the layer of encapsulating material which is to absorb the radiation emitted from the receptacle 1 of the cartridge.

If, for example, the liquid to be decontaminated has a high salt content and a low specific activity due to radionuclides in the ionic form, and hence in a form competitive with the ions of non-radioactive salts with respect to the ion-exchange constituent of the concentrating bed, it is convenient to use as large a mass as possible of the concentrating bed so as to collect a sizable quantity of radioactivity, a small thickness of encapsulating material being sufficient to attenuate the radiation. On the other hand, if a liquid having a low salt content and a high specific activity must be treated, it is convenient to use concentrating beds of small volume so as to have a sizable thickness of encapsulating material available to allow radiations of greater intensity to be absorbed. While the height of the decontaminating bed remains constant, its diameter and thus, naturally, its volume is varied.

Figure 15:
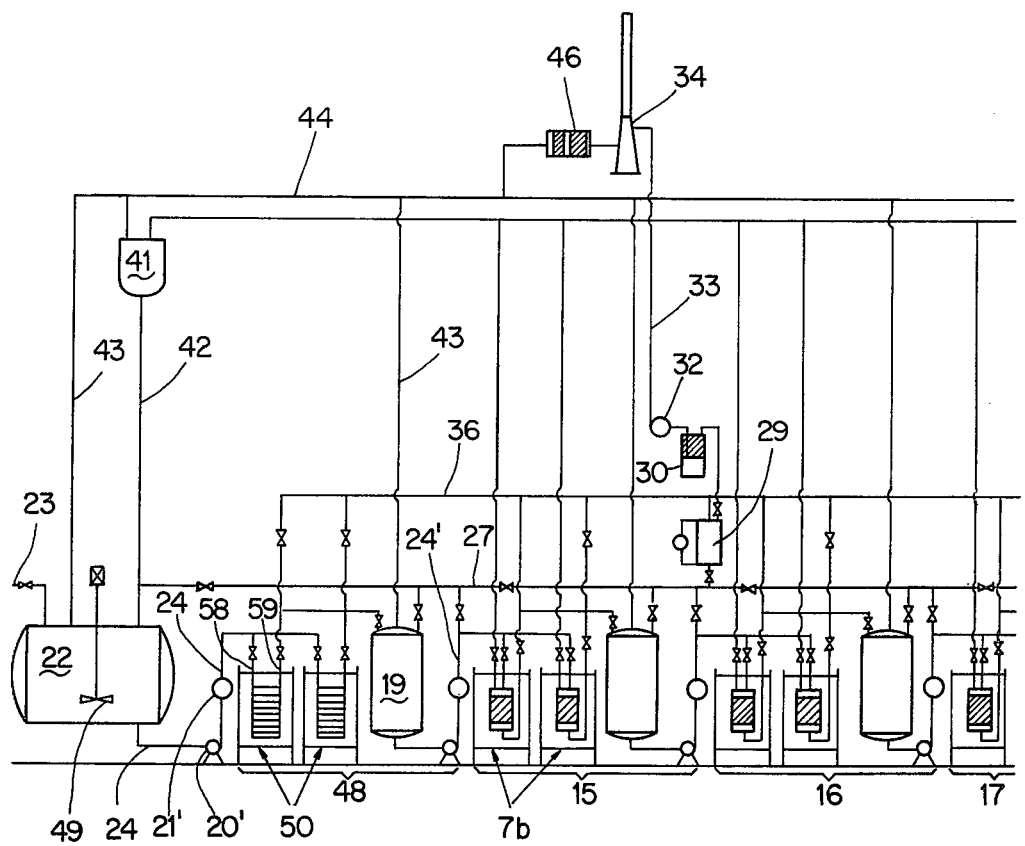
FIG. 15 is a partial diagrammatic representation of another embodiment of part of a plant according to the present invention including two purifying stations.

FIG. 15 shows schematically a plant for the continuous purification of water, for re-use and for waste, containing radioactive substances in solution and, or in dispersion, and further radioactive substances in stable suspension.

In this plant the four modules 15, 16, 17 and 18 of the plant of FIG. 14 are preceded by a filtration station, consisting of a filtration module 48 connected to the module 15 by means of a conduit 24'. The module 48 is downstream of the reservoir 22 which, in this case, is provided with a suitable agitator 49. The module 48 includes two preconditioned cartridges 50, which differ to some extent from those considered up till now but which are still formed on the same principle of preconditioning already illustrated. These have a plurality of filtering septa and are more clearly illustrated in FIGS. 16a to 17b and in FIG. 18.

Each preconditioned cartridge 50 consists of an inner cylindrical receptable 1b and an outer cylindrical container 5, the receptacle 1b being encapsulated in an encapsulating, shielding material 6, in the specific case concrete in which spaced-apart iron support rods 13 are embedded.

In the example shown, the receptacle 1b contains six elements or identical, contiguous filtering septa 51, piled one on top of the other within the receptacle 1b. Each filtering element 51 is as shown in FIG. 18. This shows a perforated plate 52 interposed between two non-perforated plates 53, the three plates being separated by means of suitable spacers 54. A circular disc 55 of filtering mesh is suitably imposed on the perforated plate 52.

The cylindrical body 56 of the receptacle 1b is provided with inlet and outlet tubes 57 for the liquid to be filtered, the tubes being disposed in pairs, one pair for each filtering element 51, circumferentially staggered around the entire surface of the body 56, as is best seen in the plan representation of FIGS. 16b and 17b.

The tubes 57 of each pair are disposed such that the inlet corresponds with the space between the perforated plate 52 and the upper plate 53 and the outlet corresponds with the space between the perforated plate 52 and the lower plate 53.

For operative simplicity, the inlet tubes are disposed along a semi-circumference of the body 56 and the outlet tubes are disposed along the other semi-circumference of the self-same body, so as to allow all the feeds to be on one side and all the discharges to be on the other side. The inlet ports and outlet ports of the tubes 57 are all at the same height above the cover of the receptacle 1b, the cover acting as the upper plate 53 for the final filtering element which is highest in the pile; the encapsulation in concrete leaves only the said ports uncovered (see FIG. 17a). The series of tubes constitutes per se an additional reinforcement for the concrete, together with the rods 13. Because of the illustrated disposition of the tubes 57, the admission of the liquid occurs through a port located to one side of the filtering septum, which allows the occurrence of a tangential current which exerts a cleaning action on one zone of the septum itself, increasing the operating time of this filtering element, with a greater accumulation of solid. The volume of solid which may be accumulated varies in dependence on its nature and form, these characteristics giving rise to a greater or lesser tendency to compaction with consequent increase in the loss of load.

The body 56 and tubes 57 are protected internally by suitable paint; during the assembly the individual filtering elements 51 are fixed to the internal surface of the body 56 by means of adhesive which ensures a perfect seal, that is the complete isolation of one filtering element from another. The discs 55 may be formed from synthetic woven materials or from stainless steel meshes.

The preconditioned cartridge 50, acting as a collector for the solid material component of the suspension which is filtered, has the following characteristics:

it allows the input of the liquid to be filtered on one side and the output of the filtrate from the other side (the input and the output are also at the same height);

it provides a series of filtering septa grouped in a pile of greatly reduced volume, on which the solid material, which is a component of the suspension is retained;

for the same total volume of the apparatus, the number of filtering septa, and hence the total filtering surface is increased as the thickness of the caked solid beyond which the rate of filtration undergoes a sharp decrease in decreasing;

it may be used under pressure or under vacuum;

it allows the passage of the liquid suspension through a single septum, by deviating the suspension to the subsequent plate immediately the said septum has become saturated;

it allows the simultaneous passage of the liquid suspension through several or all the septa, and the collection of the filtered liquid in a single collector;

it allows the maximum reduction of the volume beneath each filtering mesh, this volume to be adapted for the collection of the filtered liquid (the difference in height between the space reserved for the solid above the perforated plate 52 and that reserved for the filtered liquid below the perforated plate should be noted);

the apparatus may be formed by assembling any number of filtering elements, however large;

it allows the accumulation of radioactive solids or of toxic matter in that it is formed with a perfect seal; the encapsulating material constitutes a complete insulation and the outer container increases its mechanical strength and chemico-physical resistance;

when one septum at a time, in succession, is to be used, it allows the continuous operation of the apparatus until it is entirely exhausted;

it renders the solid residue on the septa unassailable by atmospheric agents due to the encapsulation by subsequent treatment for rendering the solids insoluble, of which more will be said below.

Turning now to FIG. 15, this shows schematically as 58 and 59 respectively, the distributor conduit connected to all the inlet tubes 57 of the cartridge 50 and the collector conduit connected to all the outlet tubes 57 of the same cartridge. A suitable valve system (not shown) allows the various filtering septa of the cartridge to be connected to the conduits 58 and 59 as desired from time to time. Each cartridge 50 may include ten or more septa and each septum, before reaching exhaustion, may support the exhaustion of several cartridges 7b with decontaminating-concentrating beds. It is possible to withdraw the residual liquid from the exhausted septa by means of the vacuum system already illustrated and subsequently to exclude these from the passage of liquid to be purified until the final septum of the cartridge is exhausted.

As in the treatment modules 15 to 18, one cartridge 50 in the filtration module 48 remains in operation while the other is at rest; once the first cartridge is exhausted, the operation is as already illustrated for the cartridge 7b. The completely exhausted cartridge 50 will be removed and subjected to the subsequent rendering-insoluble process, of which more will be said below.

Figure 19:
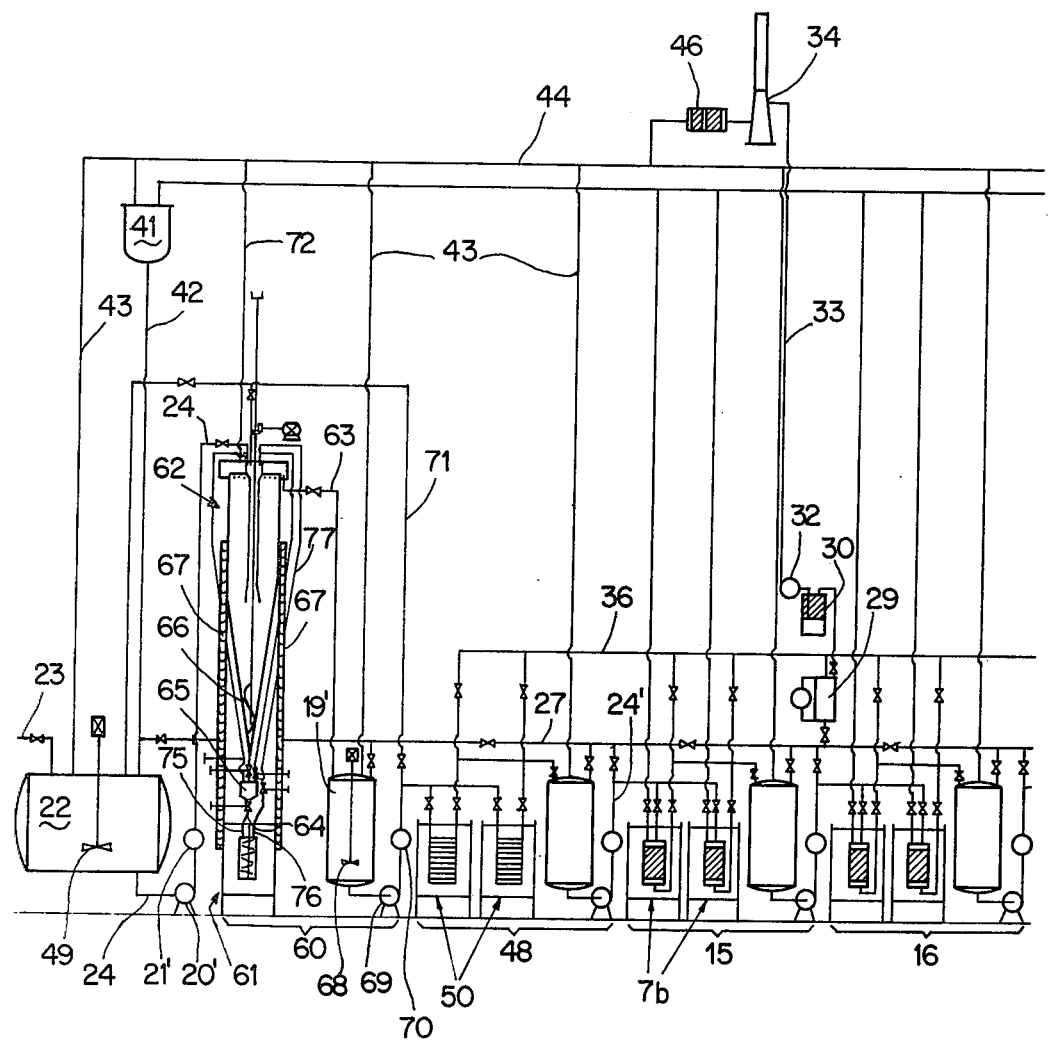
FIG. 19 is a partial diagrammatic representation of a further embodiment of a part of the plant according to the present invention, including three purifying stations.

FIG. 19 shows the plant for the purification of water containing radioactive substances in solution and, or in dispersion, plus radioactive substances in stable suspension and further radioactive substances in unstable suspension.

In the more general case of a turbid radioactive liquid containing radioactive substances both in solution and, or in dispersion and in stable suspension, as well as in unstable suspension, it is necessary to insert a decantation station upstream of the plant of FIG. 15, the station consisting of a decantation module 60, including a preconditioned cartridge 61 which is partly different from those previously described but which is formed according to the same principle as that already illustrated for the preconditioning. The cartridge 61 is more clearly illustrated in FIGS. 20a and 20b. This cartridge acts as a collector for radioactive solids which have sedimented into a dense mass in the decantation module and is applied to the base of a suitable decanter. This may advantageously consist (as is shown in FIG. 19) of a decanter-metering device 62. The principle of this apparatus is substantially as follows; the turbid liquid is fed continously (conduit 24) and while the clarified liquid also overflows continuously (conduit 63) the discharge of the thickened sludge from the bottom of the decanter-metering device 62 into the cartridge 61 may be effected intermittently (conduit 64) due to the high degree of thickening which can be attained in the decanter-metering device which retains a high level of the solid in the separating stage. This apparatus is formed so as to obtain separation of particles down to at least 0.3 mm diameter with a density also slightly greater than that of the aqueous solution (d=1.1–1.15 g/cm³) during the passage of the turbid liquid. In this manner, it is possible to achieve a concentration zone for the sludge in the lower part of the apparatus 62, the thickening of which may be completed in a regulatable metering device 65 placed underneath the decanter in conditions of almost complete rest. An agitator 66 allows the sludge to overcome the friction of the conical bottom surface making it fall towards the bottom valve of the said metering device.

Since the solids which can be sedimented and which make up the turbid feed liquid are usually associated with a considerable quantity of complex radioactivity, it may be necessary to provide suitable biological protection 67 for the zone concerned with sedimentation and metering of the solid.

The decantation module or staion includes, as well as the decanter-metering device, a reservoir 19', provided with an agitator 68, a pump 69 and a radioactivity detector 70. The purpose of this reservoir 19' is to act as a lung for possible fluctuations in the load of the decanter and to provide for the recycling of any solid entering it due to malfunction of the decanter; in this case the agitator 68 allows the reformation of the solid suspension and the conduit 71 allows its conveyance to the reservoir 22 or to the apparatus 62. The decanter-metering device 62 is vented to the flue 34 through the conduits 72 and 44.

The preconditioned cartridge 61 (FIGS. 20a and 20b) consists of an inner cylindrical receptacle 1c and an outer cylindrical container 5, the receptacle 1c being encapsulated in the material 6, consisting in the present case of concrete with a reinforcement of spaced-apart, iron support and strengthening rods 13. Within the receptacle 1c is installed a bladed agitator 73, the shaft 74 of which is rotatably mounted on the bottom and extends through the cover of the receptacle 1c; the shaft 74 projects above the upper level of the encapsulating material 6, the section which passes through the latter being protected by a sheath (not shown) which allows the rotation of the shaft 74 despite the encapsulating concrete.

The cover of the receptacle 1c also has a tube 75 (which is connected to the aforementioned discharge conduit 64 for the solids from the metering device 65, from which it transfers them to the interior of the receptacle 1c) as well as a vent 76 (which is connected to the recycling conduit 77 at the head of the decanter-metering device 62).

Figure 21:
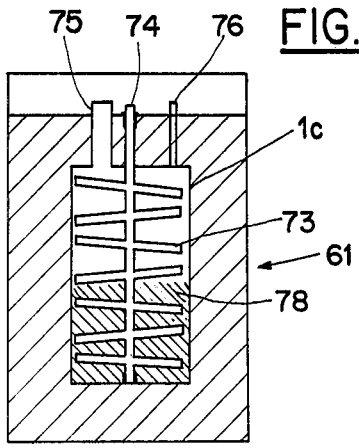
FIGS. 21 and 22 show schematically the two stages of use of a preconditioned cartridge according to FIGS. 20a and 20b.
Figure 22:
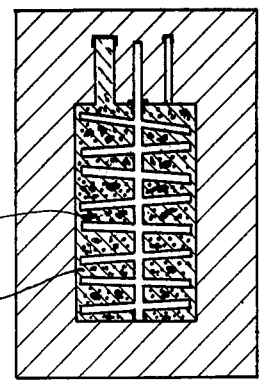

In FIG. 21 a preconditioned cartridge 61 is shown schematically as it is after it has received a load 78 of solid or radioactive waste from the metering device 65; the interior of the receptacle 1c, with the subsequent addition of a suitable material for rendering the waste insoluble (as will be better described below with reference to the rendering-insoluble operation), is completely filled; during the rendering-insoluble operation the agitator 73 is put into operation and thus allows the perfect homogenisation of the mixture of radioactive particles 79 and material 80 which can render it insoluble (FIG. 22, in which the completion of the external encapsulation of the receptacle 1c is also shown).

It should be noted that, with the preconditioned cartridge 61, there is no need for the stage shown schematically in FIG. 6, i.e. for the withdrawal of the residual decontaminated fluid by suction.

Figure 23:
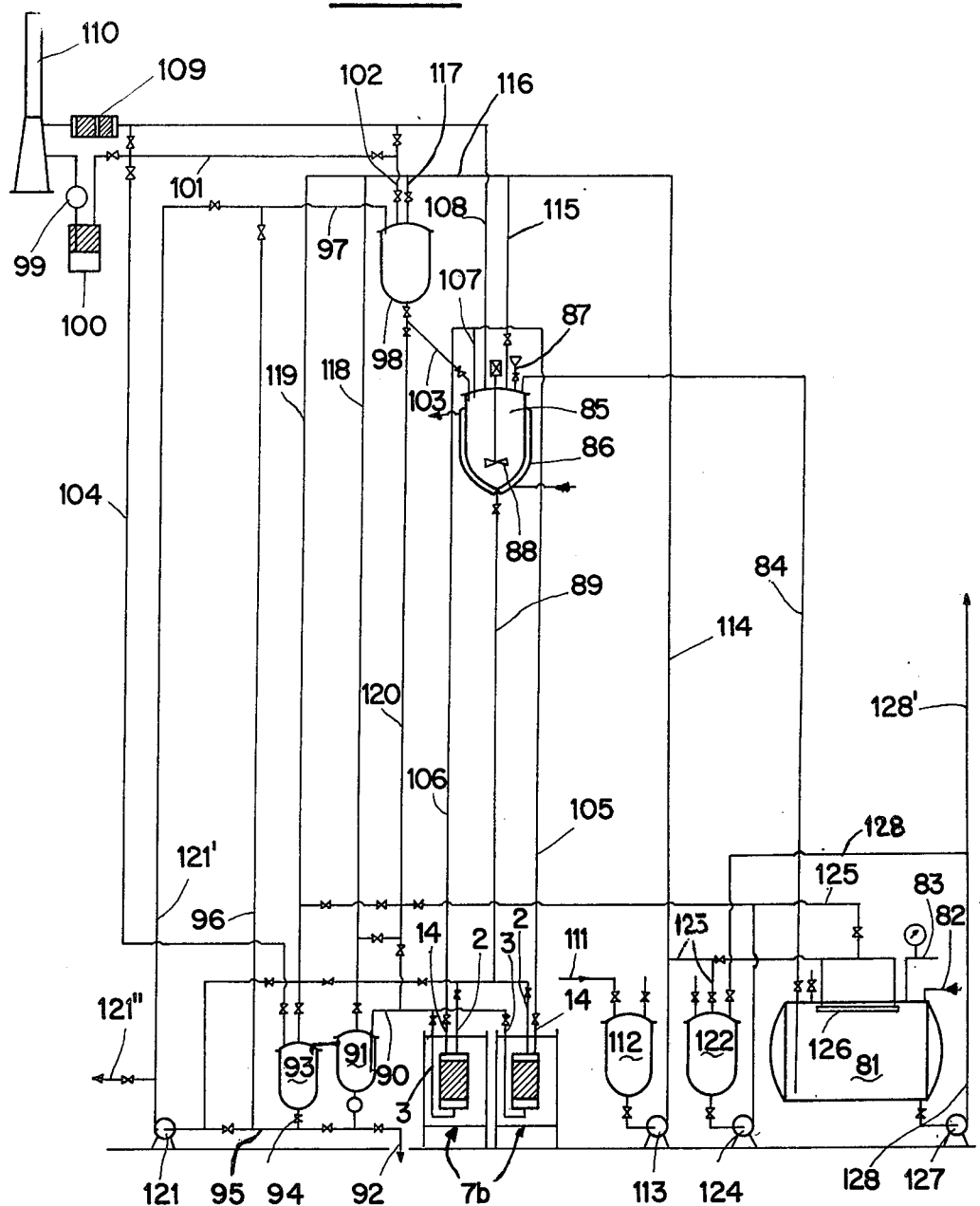
FIG. 23 shows diagrammatically a first embodiment of a second part of the plant according to the present invention.

FIG. 23 shows diagrammatically part of the plant for the continuous process of rendering the radioactive concentrated substances insoluble, these being retained in the preconditioned cartridge with the decontaminating-concentrating bed and in that with the multiple filtering septa. In the Figure, two cartridges 7b with beds have been shown but it will be understood that two cartridges 50 with filtering septa may be installed in their place; in every case one is dealing with a cartridge which, once exhausted, must be subjected to the process of rendering insoluble which has already been mentioned. The plant of FIG. 23 operates by means of the use of a monomer, such as styrene, which is polymerised within the receptacle 1 (or 1b in the case of the filtering cartridge), totally encapsulating the bed 4 and rendering the radioactive contaminating substances concentrated therein insoluble (the equivalent occurs when the cartridge 50 is treated, in which case the polymerisable material is passed into each septum to fill the remaining spaces and to render the caked material from filtration totally insoluble) The tubes 2, 3 and 14 (or 57 in the case of the cartridge 50) are also encapsulated.

The plant of FIG. 23 avoids disadvantages due to polymerisation which might occur in the various components of the plant and allows the maximum economy.

The styrene is stored in a reservoir 81 together with a suitable quantity of polymerisation inhibitor. The styrene and the inhibitor are united in the feed conduit 82. The styrene is conveyed into a pre-polymerisation receptacle 85 through a tube 84, which leads from the bottom of the reservoir, by means of a liquid-raising system including a tube 83 for the immission of compressed nitrogen, the receptacle being located at a height of several meters above the cartridges subjected to the rendering-insoluble operation.

The receptacle 85 has an outer jacket providing a space 86 for the circulation of water to retard the polymerisation of the monomer after the addition of the initiator (conduit 87) with the aid of an agitator 88.

The polymerisation mixture enters the cartridge 7b through a conduit 89 connected to the inlet tubes 2 of the cartridge, the introduction being brought about by hydrostatic pressure.

The passage and the uniform distribution of the monomer through the mass in the cartridge beds is facilitated by its high fluidity, greater than (near) that of the aqueous solution which washes the spheres or granules constituting the beds. Hence the lower viscosity of the monomer and the entraining effect produced by the hydrostatic pressure allows the complete removal of the residual aqueous solution. The excess monomer, mixed with the aqueous solution is conveyed (conduits 3 and 90) into a demixer 91, from the bottom of which the aqueous, radioactive, liquid waste is removed to be recycled through the conduit 92 to the head of the said purification plant.

The excess monomer passes through an overflow at one side of the demixer 91 into a lung receptacle 93 and from this is conveyed (conduits 94, 95, 96 and 97) into a recycling receptacle 98 due to the suction produced in this latter by a vacuum system including a vacuum pump 99, an absolute filter 100 and conduits 101, 102. From the receptacle 98 the monomer may be returned to the pre-polymerisation receptacle 85 through the conduit 103.

The connection of the preconditioned cartridges to be treated in parallel allows the introduction of the monomer into one of these, the simultaneous disconnection of the other and the insertion of a new one in its place.

By means of a conduit 104, the receptacles 93 and 91 and the conduits 90 and 3, the same vacuum pump 99 allows to operate under slight suction to bring the monomer in the preconditioned receptacles to the same level after they have been filled and before their disconnection.

The vents of the apparatus, forming part of the contaminated circuit, are connected (tubes 14 of the cartridges, conduits 105, 106, 107, 108, absolute filter 109 for retaining the particles) to a flue 110 to which also the pump 99 is connected.

The process of rendering insoluble is a discontinuous operation involving stoppages which provide a sufficiently long time for the polymerisation process to be completed. It is therefore necessary to provide the plant with a circuit for the removal of the residual monomer and subsequent washing by means of the use of an organic solvent (acetone), with recycling of the solvent which is not yet exhausted.

The acetone is conveyed through a conduit 111 from a storage tank, not shown, into a receptacle 112 from which, once the prolonged rendering-insoluble operation has been completed, it is pumped by means of a pump 113 to effect the washing of all the apparatus and all the conduits involved with the passage of the monomer. In particular, the conduits 114, 115, 116, 117, 118, 119 serve as feeds for the pure acetone; the receptacles 85, 98, 91, 93 and the conduits 103, 89, 120, 96, as well as other lengths of connecting conduits in the lower part of the plant, are involved with the passage of the acetone containing the styrene and initiator which have been washed out. Each receptacle is provided with a spray of suitable shape and dimensions (not shown) which allows the complete removal of the monomer.

A pump 121 and respective conduit 121' allow the recycling of the acetone for washing the apparatus, forming part of the radioactive circuit of the plant. The discharge of the exhausted, radioactive acetone from the washing is indicated by 121". A second receptacle 122, which is also washable with pure acetone, is provided for washing the reservoir 81 and allows the exhaustion of the solvent itself (thus reducing the consumption to a minimum, with consequent limitation of the quantity of waste solution); the acetone flows through the conduit 123 to this receptacle 122 from which, by means of a pump 124 and a conduit 125, it is conveyed to a spray 126 within the reservoir 81 which is thus washed. From the latter the acetone with the styrene and inhibitor washed out are recycled to the receptacle 122 by means of a pump 127 and a conduit 128. The exhausted acetone (with the styrene and inhibitor) are finally conveyed away from the plant through a conduit 128'.

It is clear that a suitable valve system (shown schematically in the Figure) regulates all the various operating stages of the plant conveniently.

Figure 24:
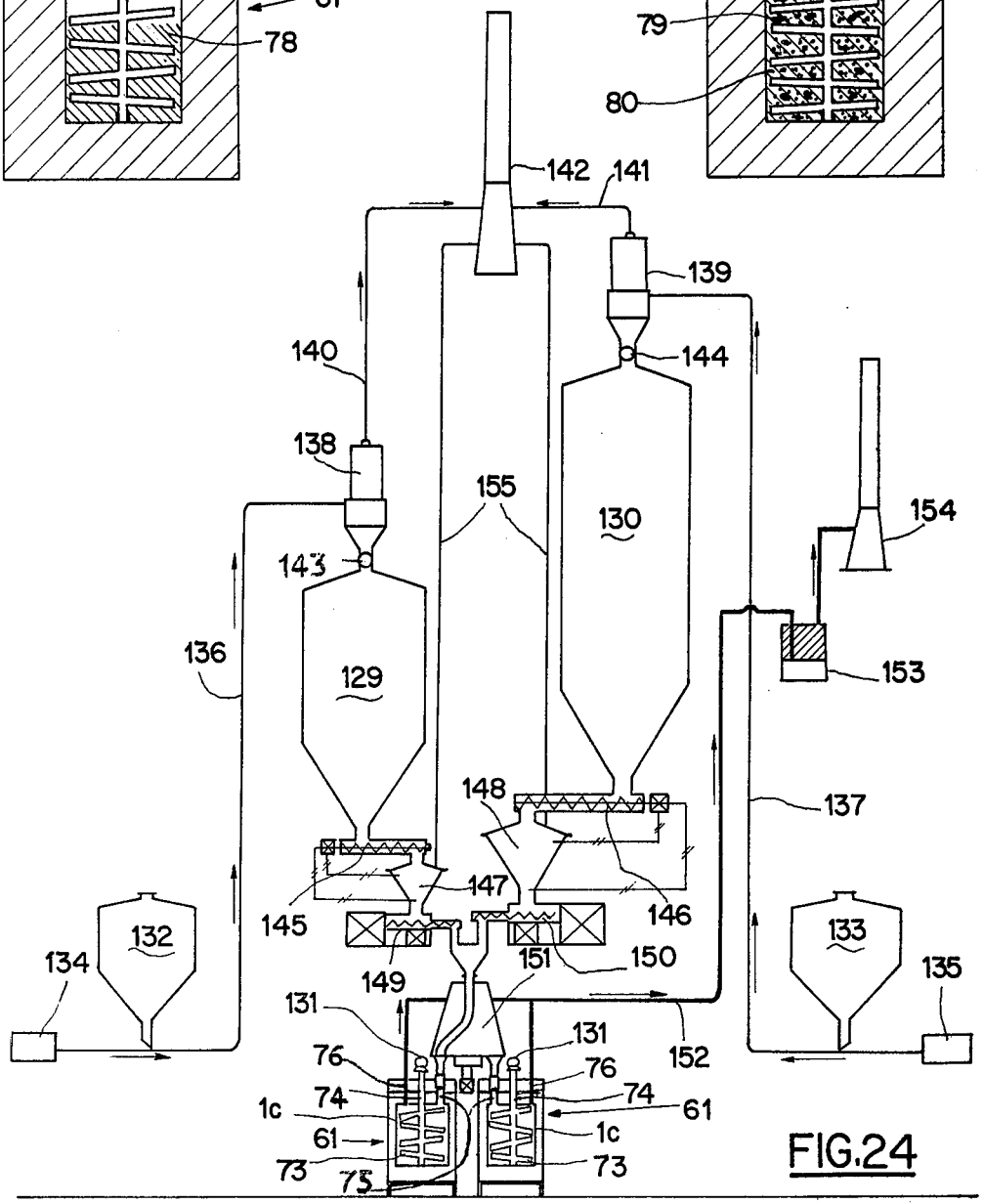
FIG. 24 shows diagrammatically a second embodiment of a second part of the plant according to the present invention.

FIG. 24 shows schematically the part of the plant which carries out the continuous process of rendering-insoluble the solid, radioactive sediments collected in the preconditioned cartridge 61, and transferred from the part of the plant shown in FIG. 19.

The nature of this radioactive sludge and, in particular, the presence therein of considerable quantities of water (10–30%), makes it convenient to render them insoluble by the use of cement mixtures rather than monomers such as styrene.

The plant of FIG. 24 does not have any disadvantages due to blockages or loss of binding power of the cement mixtures; this includes two separate feed silos for the cement (silo 129) and for the sand (silo 130) respectively, thus preventing the humidity always present in sand from inducing partial cementation and consequent agglomeration of the mixture which would thus be scarcely reactable.

On the other hand, it is convenient to convey the two components (cement and sand) into the receptacle 1c of the cartridge 61 rapidly in order to reduce the loading time to a minimum, and also to maintain homogeneity in the mass within the receptacle 1c by means of suitable agitation (for this purpose the aforesaid agitators 73 are provided, the shafts 74 of which are connected to conical coupling transmissions 131 actuated by drive devices not shown).

The supply of the two components may be effected by tank trucks 132 for the cement and 133 for the sand, the contents of which are transported pneumatically (compressors 134, 135 and conduits 136, 137) to the respective silos 129 and 130. Each of these is provided with a cyclone-filter 138, 139 for the purpose of separating the solid material from the air; the filtered air is passed to (conduits 140 and 141) a discharge flue 142. Rotary alveolar discharges 143 and 144 respectively transfer the cement and sand respectively to the respective silos. From these the material is conveyed by means of compressed air, free from humidity, through fluidising plates (not shown) in the base of the respective silo to screws 145 and 146 respectively controlled by an electronic detector (not shown) which detects the level of the material in the respective silo; these screws feed the material into the respective hoppers 147 and 148 of vibrating-screw metering devices 149 and 150 respectively in quantities corresponding to the predetermined batch.

From the discharge outlets of the two vibrating screws, the two materials pass to a multiple-path rotating distributor 151, consisting essentially of a rotating tube driven by a motor-reducer and located by a precision limit switch; this distributor allows the subsequent immission of the two materials into various preconditioned cartridges 61 placed around its outer circumference, this tube being rotated and stopped in correspondence with the inlet tube 75 of each successive cartridge 61 so as to fill them with cement and sand simultaneously. The usual means, not shown, are provided for sealing the end of the rotating tube of the distributor with the tube 75 and for de-coupling them.

The vents 76 of the cartridges are connected through a conduit 152 and an absolute filter 153 to a flue 154. Vent conduits 155 are also provided for connecting the hoppers 147 and 148 to the said flue 142.

The storage, transfer and metering system is perfectly sealed with regard to both the elimination of external dust (storage silos and transfer screws) and the internal container system (vibrating-screw metering devices, rotative distributor and preconditioned cartridges). Once the filling of the receptacles 1c of the cartridges 61 with the cement mixture has been effected, their encapsulation with any of the usual means is completed, as explained previously for the cartridges 7b and 50, the space still remaining in the outer container 5 being filled, generally with the same material as that used for the initial preconditioning. The completion of the filling of the residual space in the cartridges 61 (possibly also comprising their tubes used for the immission of sand and cement and for venting air) may also be effected with monomer, which has the advantage of negligible shrinkage, by using a temporary tube connected with the pre-polymerisation receptacle of the part of the plant of FIG. 23.

The cartridges 61 will finally also be completely suitable, without any further handling, for final disposal either in the earth or in the sea.

Figure 25:
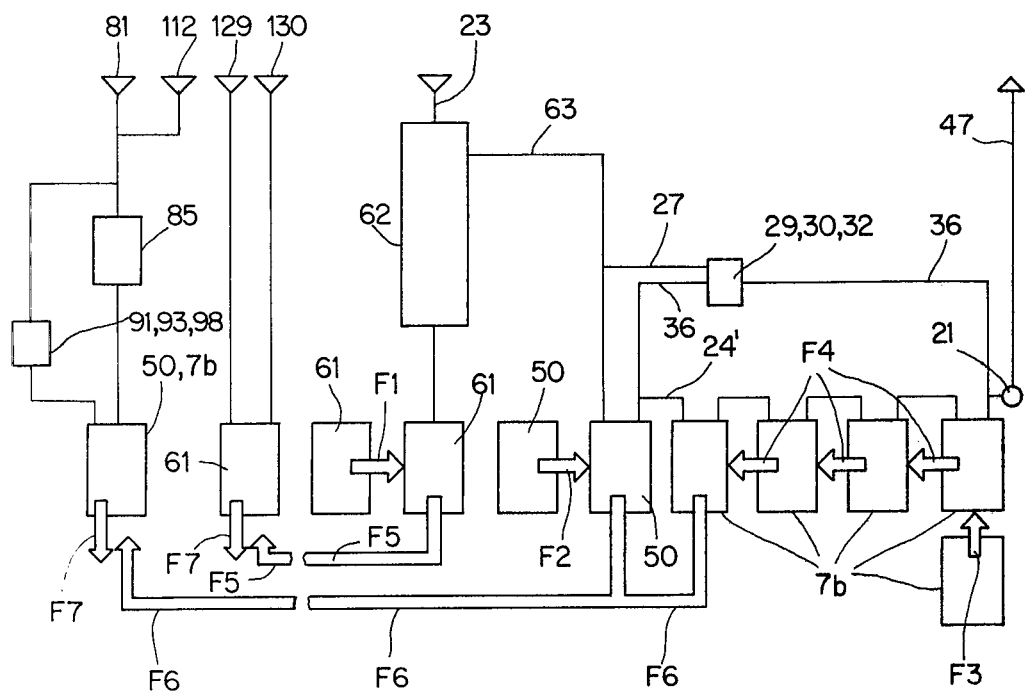
FIG. 25 is a combined schematic block diagram of one type of plant according to the invention.

Referring finally to FIG. 25, in this the entire process and an entire plant according to the present invention, are shown schematically (with a purification state of the type shown in FIG. 19) with the sole exception of the prior preconditioning stage for the various cartridges.

By 23 is again indicated the feed conduit for the water containing radioactive substances in solution and, or in dispersion as well as radioactive substances in stable suspension and further radioactive substances in unstable suspension; one sees how this water passes first through the decanter-metering device 62 of the decantation station, from the bottom of which the sedimented, radioactive sludge is collected in the preconditioned cartridge 61; the arrow $F_1$ indicates the progressive substitution of each filled cartridge 61 by another cartridge 61 to be filled. The clarified liquid passes (conduit 63) to the preconditioned cartridge 50 of the filtration module; the arrow $F_2$ also indicates here the progressive substitution of the exhausted cartridges 50 by new cartridges 50. The liquid effluent from the filtration module then flows (conduit 24') into the various final treatment modules, which employ the preconditioned cartridges 7b with decontaminating-concentration beds; the detector of the level of residual radioactivity and the conduit for carrying the final flow of purified liquid are again indicated by 21 and 47 respectively. Progressive feed of the preconditioned cartridges to the plant is indicated by $F_3$. The progressive displacement of the cartridges from a downstream position to a position further upstream, corresponding to a liquid having a higher specific activity, is indicated by $F_4$; to the left of the final arrow $F_4$, the cartridge 7b will be completely exhausted, that is saturated. By 29, 30, 32 are again indicated the vacuum group with its conduit 36 for withdrawing the residual liquid by suction and the recycling conduit 27.

The cartridges 61, 50 and 7b, once used or exhausted, are carried (it should be noted at this point that their transport may be effected by any means and without any particular precautions, thanks to the prior shielding applied in the preconditioning stage; the application of stoppers, such as 9 and 10 will suffice: the radiation passing through the tubes 2 and 3 is unimportant) to the process of rendering-insoluble their radioactive contents. More precisely, the cartridges 61 are carried (arrow $F_5$), to the plant of FIG. 24 for the conditioning, or rendering-insoluble treatment; in FIG. 25 are shown schematically and indicated again by 129 and 130 the silos for storing and feeding cement and dried sand respectively; the cartridges 50 and 7b are carried instead (arrow $F_6$) to the plant of FIG. 23 for conditioning or rendering-insoluble; in FIG. 25 the reservoir for storing and feeding the monomer and its additives is again indicated by 81, the pre-polymerisation receptacle by 85, the feed receptacle for the organic washing solvent by 112 and the de-mixing and recycling group by 91, 93, 98.

Finally by F7 is shown schematically the removal of the preconditioned cartridges which have been subjected to the rendering-insoluble treatment and which are to be completely encapsulated in the material 6, once the process of internal polymerisation or setting has been completed, to render them suitable for their final disposal, whether in the earth or in the sea, in conditions of complete safety.

The present invention has been described with particular reference to the case of water contaminated by radioactive substances; the same basic principles may be applied, as has already been mentioned at the beginning, to the case of fluids (liquids or gases) in general, contaminated by radioactive or non-radioactive substances, for example chemically active, toxic compounds; in fact, even in this case, the preconditioning may be very useful and advantageous since, even if the shielding, for example by concrete, no longer has the function of absorbing radiations which in this case do not exist, it still has the advantage of allowing the purification and rendering-insoluble to be carried out in the optimum conditions of safety and of at least providing a container and, finally, a finished product which may be handled and transported with the maximum safety and facility and which has the maximum endurance and resistance to chemical attack, mechanical stress and to naturally occurring agents, due to the mechanical and chemico-physical characteristics of the concrete, without the need to use, on the other hand, costly metallic materials.

The process and the plant according to the present invention allow, in the last analysis, the serious problem of the final disposal of particular waste materials to be resolved brilliantly and without risks, hence resulting in high technological progress in this field, to which are linked considerable economic advantages in that, even though several of the components of the invention must be expendable, these may be made from cheap materials, with low manufacturing costs and, in any case, the invention achieves a considerable saving in costs due to the elimination of the complex and costly technical safety devices necessary until now.

It is understood that many variations and modifications may occur to experts in this subject compared with the illustrated embodiments of the present invention given by way of example, without departing from the spirit of the invention. It is clear that these variations and modifications all fall within the scope of the invention.

I claim:

1. In a process for continuously treating contaminants contained in a fluid, for the purpose of their final disposal, comprising providing at least one expendable collecting receptacle which has an inlet port and an outlet port and which is totally encapsulated with a solid inert mass except for the ports, purifying the fluid by at least one operation which includes treating the fluid to remove contaminants therefrom and retaining the contaminants in said collecting receptacle, the fluid having been passed into said collecting receptacle through said ports, and subsequently encapsulating the ports in a solid inert mass, the improvement of (a) placing the collecting receptacle in an open top container of substantially greater size than the collecting receptacle, and totally encapsulating the collecting receptacle except for the ports with said solid inert mass which is added to the container before purifying the fluid, so as to completely surround the collecting receptacle up to a level above the top of the collecting receptacle and below the ports and the top of the container, said mass functioning as a biological shield, or as a coating resistant to chemical attack and mechanical stress, or as a biological shield and as a coating resistant to chemical attack and mechanical stress, and (b) rendering insoluble the contaminants within said collecting receptacle by passing into said receptacle in a continuous way through said inlet port with excess passing out through said outlet port, after purifying the fluid and before encapsulating the ports, at least one substance which solidifies to a solid matrix therefore rendering the contaminants insoluble within said collecting receptacle.

2. A process as in claim 1 wherein a plurality of said collecting receptacles are provided, the receptacles being of different types which are separate and independent of each other and which retain contaminants by different functions, the process comprising passing the fluid through the receptacles separately in succession.

3. A process as in claim 1 wherein at least one collecting receptacle includes at least one internal bed of decontaminating-concentrating material adapted to remove contaminants from the fluid and wherein the purification step includes passing the fluid into the receptacle, through the bed of material and out of the receptacle, said bed being utilized to saturation.

4. A process as in claim 3 wherein the decontaminating-concentrating material comprises a resin which acts as an ion exchange medium or as an adsorption medium or as both.

5. A process as in claim 1 wherein the contaminated fluid contains solid particles, wherein at least one collecting receptacle includes meshed filtering means and wherein the purification step includes passing the fluid into the receptacle through the filtering means and out of the receptacle.

6. A process as in claim 1 wherein said substance for rendering insoluble is a polymerizable monomer and wherein the step of rendering the contaminants insoluble is effected by polymerizing the monomer.

7. A process as in claim 1 wherein the contaminated fluid contains contaminants which remain in suspension or solution and wherein there is at least one collecting receptacle provided with internal meshed filtering means and at least one second collecting receptacle provided with at least one internal bed of decontaminating-concentrating material, said purification operation including passing the fluid through said one collecting receptacle and the filtering means therein and passing the thus-filtered fluid into the second collecting receptacle, through its bed and out of the receptacle.

8. A process as in claim 1 wherein the contaminated fluid contains solid contaminant particles which may be made to settle and other contaminants which remain in suspension or solution and wherein there is at least one collecting receptacle provided with an internal agitator, at least one second collecting receptacle provided with internal meshed filtering means and at least one third collecting receptacle provided with at least one internal bed of decontaminating-concentrating material, said purification operation including continuously passing the fluid through decanting means which densifies the solids contained in the fluid, passing the thus-densified solids to said one collecting receptacle where they are retained, passing the fluid from the decanting means through the second collecting receptacle and the filtering means therein and passing the thus-filtered fluid into the third collecting receptacle, through its bed and out of the receptacle.

* * * * *

UNITED STATES PATENT AND TRADEMARK OFFICE
CERTIFICATE OF CORRECTION

PATENT NO. : 4,436,655
DATED      : March 13, 1984
INVENTOR(S): Ermanno Masotti and Sergio Gagliardi It is certified that error appears in the above-identified patent and that said Letters Patent is hereby corrected as shown below:

On the front page format, please correct the spelling
(each occurrence) of the first named inventor to
--Ermanno Masotti--.

Signed and Sealed this

Fifth Day of March 1985

[SEAL]

Attest:

DONALD J. QUIGG

Attesting Officer     Acting Commissioner of Patents and Trademarks